United States Patent [19]
Chang et al.

[11] Patent Number: 5,454,047
[45] Date of Patent: Sep. 26, 1995

[54] OPTICAL METHOD AND SYSTEM FOR GENERATING EXPANSION COEFFICIENTS FOR AN IMAGE PROCESSING FUNCTION

[75] Inventors: David B. Chang, Tustin; I-Fu Shih, Los Alamitos, both of Calif.

[73] Assignee: Hughes Aircraft Company, Los Angeles, Calif.

[21] Appl. No.: 180,394

[22] Filed: Jan. 12, 1994

Related U.S. Application Data

[63] Continuation of Ser. No. 884,502, May 15, 1992, abandoned.

[51] Int. Cl.$^6$ ........................................... G06K 9/76
[52] U.S. Cl. ......................... 382/280; 359/560; 382/210
[58] Field of Search ............... 382/31, 42; 364/822; 359/15, 19, 560, 554, 561

[56] References Cited

U.S. PATENT DOCUMENTS

| | | | |
|---|---|---|---|
| 4,837,843 | 6/1989 | Owechko | 382/31 |
| 4,838,644 | 6/1989 | Ochoa et al. | 382/31 |
| 4,908,702 | 2/1990 | Chao et al. | 382/31 |
| 4,949,389 | 8/1990 | Allebach et al. | 382/31 |
| 5,148,496 | 9/1992 | Anderson | 382/31 |
| 5,150,229 | 9/1992 | Takesue et al. | 382/31 |
| 5,159,474 | 10/1992 | Franke et al. | 359/559 |
| 5,175,775 | 12/1992 | Iwaki et al. | 359/561 |

*Primary Examiner*—Joseph Mancuso
*Attorney, Agent, or Firm*—W. K. Denson-Low

[57] ABSTRACT

A system for optically generating expansion coefficients for an image processing function. The invention (10) includes a first optical element (18) for providing a transform of an image provided at a first image plane (16). A second optical arrangement (20) provides a product of the transform of the image and a transform of a convolving function. This product is transformed by a lens (22) to provide an image intensity distribution representative of expansion coefficients resulting from a convolution of the image by the convolving function. In a specific implementation, the convolving function is a wavelet and the intensity distribution is detected to provide the expansion coefficients.

13 Claims, 2 Drawing Sheets

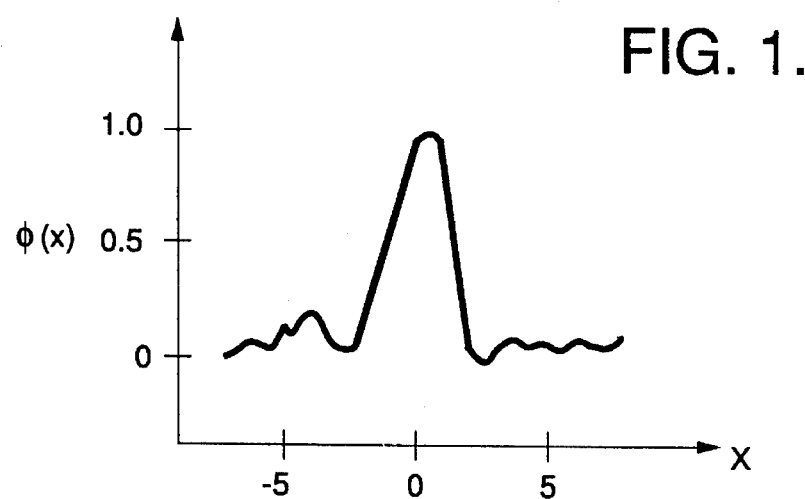
FIG. 1.
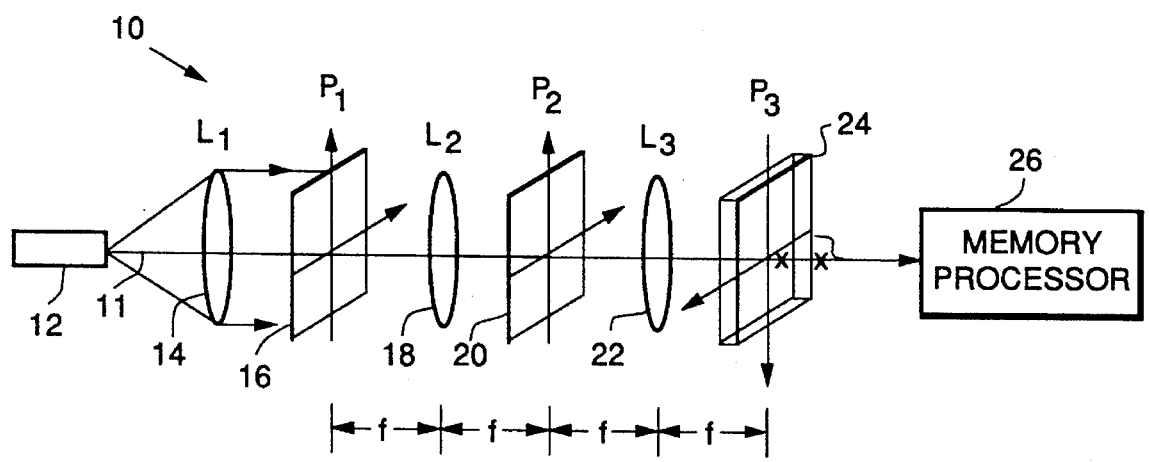
FIG. 2.
FIG. 3.
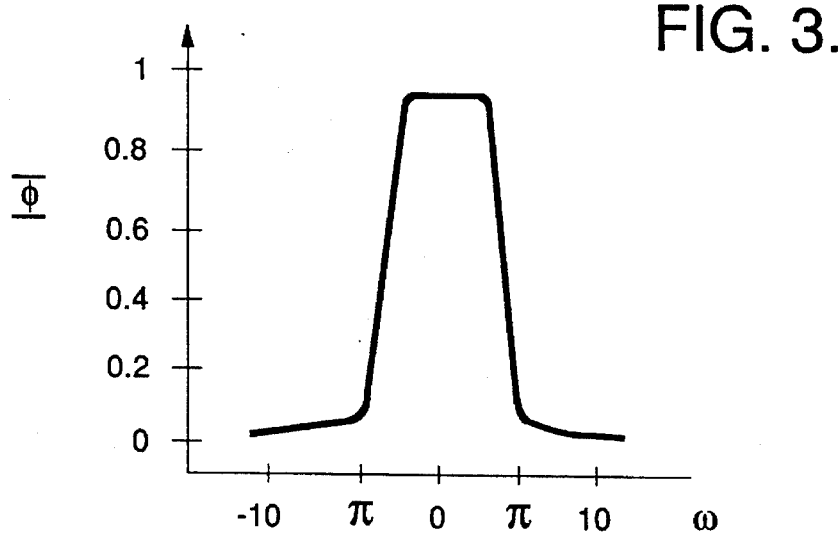

OPTICAL METHOD AND SYSTEM FOR GENERATING EXPANSION COEFFICIENTS FOR AN IMAGE PROCESSING FUNCTION

This is a continuation of application Ser. No. 884,502, filed May 15, 1992 now abandoned.

BACKGROUND OF THE INVENTION

1. Field of the Invention

The present invention relates to image processing systems. More specifically, the present invention relates to image processing systems employing image compression technology.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

DESCRIPTION OF THE RELATED ART

Image processing is useful, if not required, in many applications. Consider, for example, optical pattern recognition, used in commercial and military aircraft and spacecraft applications. In a typical optical pattern recognition application, numerous complicated mathematical operations may be required on a considerable amount of image data in order to focus the image and to recognize patterns therein.

In such applications, processing of the image data is often facilitated by compression of the image. Initially, image compression was achieved with use of a Fourier transform operation on the image data. As is well known in the art, use of a Fourier series to transform the image provides for the generation of a set of expansion coefficients which may be stored and used to recreate the image. This approach was considered to be much simpler than storing the original image pixel-by-pixel. The number of coefficients needed to be stored depends on the complexity of the scene and the requirement of regeneration fidelity.

Unfortunately, where the image is highly localized in terms of the number of spatial high frequency components, a Fourier series analysis generates a large number of terms associated with these components which must be carried throughout the image. The handling of these terms is somewhat burdensome.

Accordingly, techniques were developed by which the Fourier series was localized in space. In accordance with one such technique, images are decomposed into "wavelet functions", an example of which are trigonometric functions surrounded by a Gaussian envelope. It has been shown that using a wavelet representation, an ortho-normal basis can be formed and used for a series expansion of a function. The expansion coefficients thus generated may be used to recreate the image as with a Fourier series approach. The advantage is that fewer terms are required to effectively recreate an image.

Associated mathematical techniques have been developed to facilitate the selection of the optimal wavelet functions, to determine how much of each of a combination of functions to use to describe a particular image and what the coefficients of expansion are for a given wavelet.

The problem with this approach is that it involves the use of computers or digital processors to digitize and process the image to compute the coefficients of expansion for the selected wavelets. This is expensive in that it is time consuming in terms of processor or computer time.

Accordingly, a need exists in the art for an inexpensive image data compression technique. Particularly, there is a need in the art for an inexpensive technique for generating expansion coefficients for a wavelet function.

SUMMARY OF THE INVENTION

The need in the art is addressed by the present invention which provides a system for optically generating expansion coefficients for an image processing function. The invention includes a first optical element for providing a transform of an image. A second optical arrangement provides a product of the transform of the image and a transform of a convolving function. This product is processed optically to provide an image intensity distribution representative of expansion coefficients resulting from a convolution of the image by the convolving function.

In a specific implementation, the convolving function is a wavelet and the intensity distribution is detected to provide the expansion coefficients.

Thus an inexpensive image data compression technique is provided by which expansion coefficients for a wavelet function are generated in the optical domain.

BRIEF DESCRIPTION OF THE DRAWINGS

FIG. 1 is a graphical representation of a typical wavelet $\phi(x)$.

FIG. 2 is a simplified schematic diagram of the system for optically generating expansion coefficients for an image processing function of the present invention.

FIG. 3 represents the Fourier transform of the wavelet of FIG. 1.

DESCRIPTION OF THE INVENTION

Figure 4:
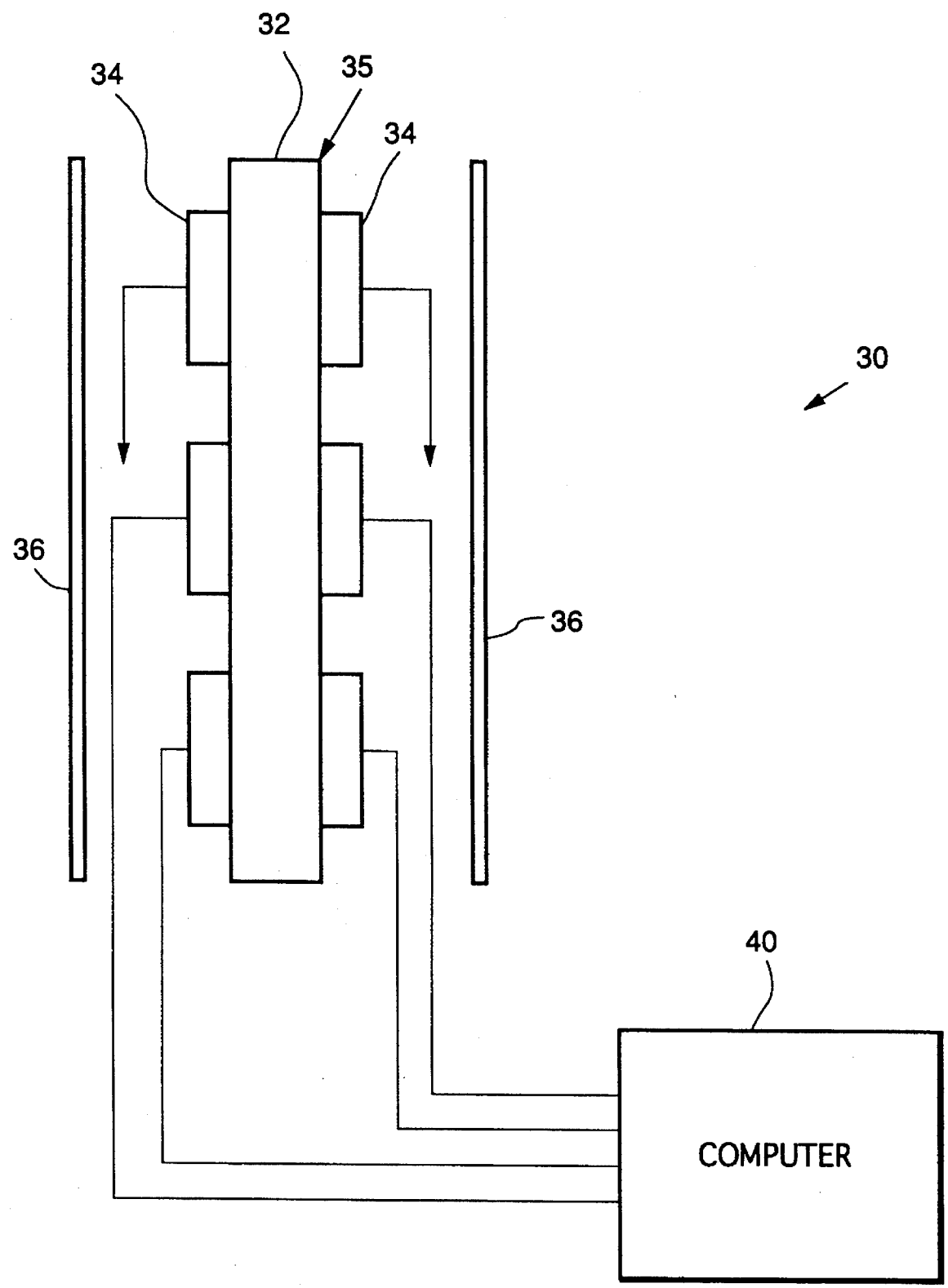
FIG. 4 depicts an element which may be used for the purpose of automatically presenting the input image and the filter in the first and second image planes, $P_1$ and $P_2$, respectively.

Illustrative embodiments and exemplary applications will now be described with reference to the accompanying drawings to disclose the advantageous teachings of the present invention.

It has been common practice to represent an image by its frequency (spatial) contents. For example, a one-dimensional image $I(x)$ can be represented by its Fourier components:

$$I(x) = \int_{\infty}^{\infty} a(\omega) e^{i\omega x} d\omega \tag{1}$$

or $$I(x) = \sum_{n=-\infty}^{\infty} a_n e^{i\omega_o n x}$$

where
 $\omega$=angular frequency;
 $a(\omega)=\frac{1}{2}\int I(x)e^{-i\omega x}dx$; and
 $a_n=i/L\int I(x)e^{-i\omega_o n x}dx$.

Similar expressions can be written for a two dimensional image with a double integral or a double sum. One benefit of the Fourier representation is that the original image can be stored and later regenerated with the set of coefficients $\{a_n\}$ which is much simpler than storing the original image intensity pixel-by-pixel. As mentioned above, the number of coefficients needed to be stored depends on the complexity of the scene and the requirement of regeneration fidelity. For a highly localized scene, a large number of terms (many coefficients) are needed for a faithful representation.

In a wavelet representation, the image is decomposed into a set of wavelet functions. Using wavelets, fewer terms are required to effectively represent an image. It has been shown that there exists a wavelet function $\phi(x)$ such that $\{(2^{-j})^{1/2}\phi(x-2^{-j}n)\}_{j,n}$ forms an ortho-normal basis and can be used for a series expansion of a function. An orthonormal basis is one in which the integral of any member of the basis with its complex conjugate is unity, whereas the integral of any member with the complex conjugate of another member is zero. Specifically, $$f(x) = 2^{-j} \sum_{n=-\infty}^{\infty} <f(u), \phi_{2j}(u - 2^{-j}n) > \phi_{2j}(x - 2^{-j}n) \qquad [2]$$

where different j's and n's indicate different dilations and translations of $\phi(x)$. In other words, each $\phi_{2j}(x-2^{-j}n)$ resembles the others, differing only in its size (dilation factor) and in the point about which it peaks (where the peak has been translated). Equation 2 approximates the function f(x) at the resolution level $2^j$, with a set of wavelet functions. A typical wavelet $\phi(x)$ such as that shown graphically in FIG. 1 may be chosen for this purpose.

The image f(x) at the resolution $2^j$ is characterized by the set of coefficients which are inner products $\{<f(u),\phi_{2j}(u-2^{-j}n)>\}n$. Each inner product can be interpreted as a convolution product evaluated at point $2^{-j}n$. That is, $$A^n_{2j} \equiv <f(u), \phi_{2j}(u - 2^{-j}n)> \qquad [3]$$

$$= \int_{-\infty}^{\infty} f(u)\phi_{2j}(u - 2^{-j}n)du$$

The present invention utilizes optical processing to determine the values of the coefficients $A^n_{2j}$. The optical system of the present invention is depicted in the simplified schematic diagram of FIG. 2. The system 10 includes a high intensity source of coherent light energy 12. Light from the source 12 is collimated by a collimating first lens 14. The source 12 may be a laser, as is known in the art, in which case, the collimating lens 14 may not be necessary. The image to be compressed or convolved is provided in the optical path 11 of the source 12 at a first image plane on a photographic plate 16 which may be implemented as a space varying transmittance film. The image on the plate 16, thus illuminated, is Fourier transformed by a second lens 18 disposed in the optical path 11 of the source 12 at the focal length of the lens 18. The Fourier transform of the image illuminates a second photographic plate 20 at a second image plane disposed in the optical path 11 at the focal length of the second lens 18.

In accordance with the present teachings, a Fourier transform of a wavelet convolving ("Airy") function is disposed on the second photographic plate 20. Thus, the product of the Fourier transform of the image and the Fourier transform of the wavelet convolving function is present in the optical path after the second photographic plate 20.

A third lens 22 is located in the optical path 11 at the focal length thereof from the second photographic plate 20. The third lens 22 transforms the product of the Fourier transform of the image and the Fourier transform of the wavelet convolving function to provide a spatial intensity distribution on a detector array 24 at a third image plane corresponding to the correlation of the image with the convolving function. Electrical signals corresponding to the spatial intensity distribution across the third image plane are stored as the coefficients of the wavelet representation of the image in a memory/processor 26.

In operation and for simplicity consider a one-dimensional image represented by the function f(x) inserted in the first image plane at $P_1$. As the collimated light from the source 12 illuminates the film on the plate 16 the amplitude distribution at the second image plane $P_2$ formed by the second lens 18 is the Fourier transform of f(x). The second photographic plate 20 is a filter which represents the Fourier transform of the convolving function $\phi_j(n=2^{-j}n)$. The amplitude distribution behind the filter is thus proportional to the product $F\Phi$, where $F$ and $\Phi$ are Fourier transforms of f and $\phi$.

When the third lens 22 transforms this amplitude distribution an intensity distribution is created at the third image plane $P_3$ corresponding to the convolution of equation [3]. The coefficients $A^n_{2j}$ in the wavelet representation can therefore be determined from the intensity distribution in the third image plane $P_3$.

For the wavelet representation shown in FIG. 1, the Fourier transform $\Phi$ appears as shown in FIG. 3. That is, the filter at the second image plane $P_2$ is simply a round aperture (a low pass filter). Different sizes of the aperture can be chosen for different resolution levels $2^j$. The intensity at $x_j=2^{-j}n$ in the third image plane $P_3$ is proportional to the coefficient $A^n_{2j}$. The actual intensity will depend on the losses in the optical system. However, this essentially provides an optical means of generating an intensity proportional to the integral of equation [3], where $\phi$ is an Airy function It is evident that the optical processing of the present invention provides a high-speed method for determining the expansion coefficients of a wavelet representation of an image. For a filter of $2^j$ resolution, the complete set of coefficients $\{A^n_{2j}\}$ can be determined simultaneously at the third image plane $P_3$. By changing this filter to one of another resolution, say $2^{j+1}$, the set of coefficients $\{A^n_{2j+1}\}$ can be found.

Automation of the invention may be achieved by using a real-time optical processor in which light valves are used to present the input image and the filter in the first and second image planes, $P_1$ and $P_2$, respectively. For example, FIG. 4 depicts an element 30 which may be used for the purpose of automatically presenting the input image and the filter in the first and second image planes, $P_1$ and $P_2$, respectively. A birefringent material 32 is sandwiched between an array of transparent electrodes 34. Each electrode may be a thin film (e.g. 400 Å thick) of In Tin-Oxide or other suitably conductive material. By applying different voltages across any pair of opposing electrodes, the degree of birefringence can be varied across the face of the sandwich 35. A linear polarizer 36 is placed before and after the sandwich 35. A computer 40 may be used to vary the voltages applied to the electrodes. Thus, a means of automatically varying the size and location of the Fourier Transform $\Phi$ of FIG. 3 is obtained.

Thus, the present invention has been described herein with reference to a particular embodiment for a particular application. Those having ordinary skill in the art and access to the present teachings will recognize additional modifications applications and embodiments within the scope thereof. For example, the invention is not limited to operation in a transmissive mode. The present teachings may be implemented in a reflective system as well.

It is therefore intended by the appended claims to cover any and all such applications, modifications and embodiments within the scope of the present invention.

Accordingly,

What is claimed is:

1. A system for optically generating expansion coefficients for a wavelet representation of an image, said image comprising a series of wavelet functions, comprising:

first optical means for providing an optical representation of said image;

second optical means for Fourier transforming said optical representation of said image;

third optical means for optically providing a Fourier transform of a convolving function of said wavelet functions;

fourth optical means for providing an optical product of the Fourier transform of said image and the Fourier transform of said convolving function of said wavelet functions;

fifth optical means for optically transforming said product to provide a spatial intensity distribution representative of the expansion coefficients of said wavelet representation of said image on optical detector array, said detector array responsive to said spatial intensity distribution for generating electrical signals corresponding to said intensity distribution which are representative of the expansion coefficients of said wavelet representation of said image; and means for storing said electrical signals as a wavelet representation of said image.

2. The invention of claim 1 wherein said first optical means includes a source of collimated energy.

3. The invention of claim 2 wherein said source of collimated energy includes a light source and a collimating first lens.

4. The invention of claim 2 wherein said first optical means incudes means for providing said optical representation of said image at a first image plane.

5. The invention of claim 4 wherein said first optical means includes a photographic plate on which said optical representation of said image is stored.

6. The invention of claim 4 wherein said second optical means includes a second lens for providing a Fourier transform of said optical representation of said image at a second image plane.

7. The invention of claim 1 wherein said third optical means comprises an optical low pass filter.

8. The invention of claim 1 wherein said third optical means includes a photographic plate on which a diffraction pattern of a round aperture is stored.

9. The invention of claim 1 wherein said fifth optical means includes a third lens for transforming the product of the transform of the image and the transform of the convolving function to provide said image intensity distribution representative of expansion coefficients resulting from a convolution of said image by said convolving function at a third image plane.

10. The invention of claim 1 wherein said detector array comprises array means for detecting the spatial intensity distribution across said third image plane.

11. The invention of claim 1 wherein said wavelet convolving function is an Airy function, and said third optical means comprises an optical low pass filter.

12. The invention of claim 11 wherein said optical low pass filter comprises a photographic plate on which is formed an optical representation of the diffraction pattern of a round aperture.

13. A method for generating expansion coefficients for a wavelet representation of an image, said image comprising a series of wavelet functions, including the steps of:

optically transforming said image;

providing an optical representation of said convolving function of said wavelet functions;

optically transforming the optical representation of said wavelet convolving function;

optically forming the product of the image transform and the wavelet convolving function transform; and optically transforming the product of the image transform and the wavelet convolving function transform, thereby providing a spatial intensity distribution representative of the wavelet expansion coefficients of said wavelet function representation of said image;

detecting said spatial intensity distribution;

generating electrical signals corresponding to said detected spatial intensity distribution which are representative of the expansion coefficients of said wavelet representation of said image; and storing said electrical signals as a wavelet representation of said image.

* * * * *